Aug. 12, 1969 K. R. WENDT 3,461,232
POWER SYSTEM FOR TELEVISION RECEIVERS
Filed July 1, 1966
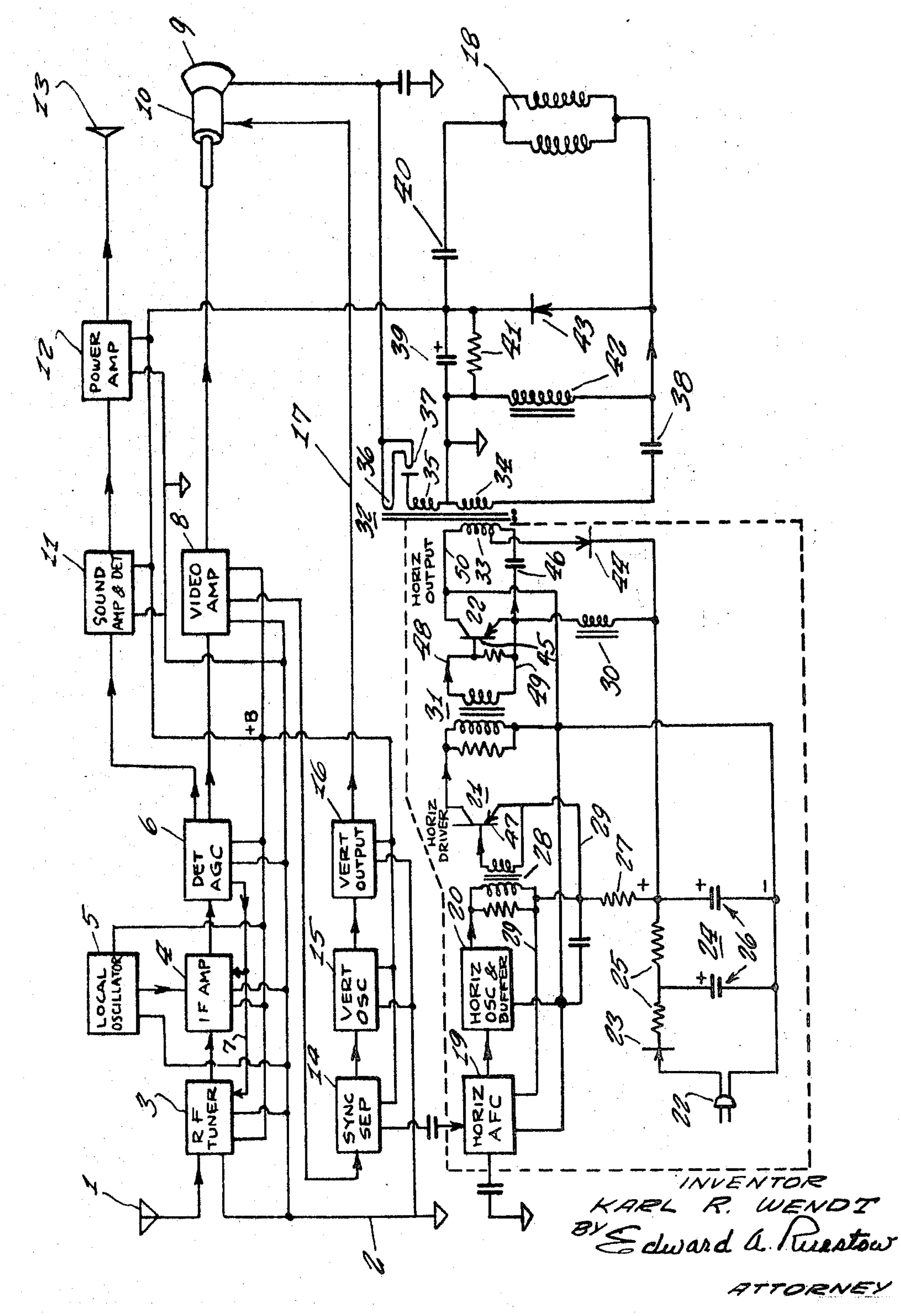
INVENTOR
KARL R. WENDT
BY Edward A. Ruestow
ATTORNEY United States Patent Office 3,461,232

Patented Aug. 12, 1969

3,461,232

POWER SYSTEM FOR TELEVISION RECEIVERS

Karl R. Wendt, Box 282, Boulder Heights, Colo. 80302

Filed July 1, 1966, Ser. No. 562,293

Int. Cl. H04n *3/16, 5/38;* H01j *29/70*

U.S. Cl. 178—7.3 6 Claims

ABSTRACT OF THE DISCLOSURE

A television receiver power supply of the transformerless type is provided wherein the usual shock hazard associated with that type of supply has been eliminated. Isolation of the chassis from either side of the power line is effected by deriving from the horizontal output transformer the necessary "B" potential for operating the various stages of the television receiver. The primary of the output transformer and the associated components for energizing the primary winding, including the transformerless power supply connected to the AC line, are completely insulated from the receiver chassis. Thus by having the horizontal output transformer supply "B" power in addition to its normal functions, the low frequency line transformer can be omitted without creating a shock hazard.

This invention relates to a power system for television receivers, particularly transistorized television receivers, and has for its general object the provision of a circuit which dispenses with the usual power transformer.

In the television industry there has always been a strong desire to build receivers without power transformers both to save cost and to save weight. However there are complications. In the simplest form the chassis may, depending on which way the plug is inserted in the usual domestic power source, be hot, that is to say it may have a dangerous voltage applied to it because it may be connected to the high voltage side of the power source. For that reason all the knobs must be carefully insulated, and the receiver housing must be carefully constructed to make it impossible for children or others to touch the chassis with metal objects. The deaths of a number of children has made this type of construction unpopular. In the alternative, all electrically dangerous parts of the receiver may be insulated from the receiver chassis. But this construction may cost enough to cancel the savings without removing the danger completely. Up to the present, this problem has remained unsolved. There is also another disadvantage with transformerless receivers up to the present. The 150 volts available is too low for the easy and efficient design and operation of a tube receiver, and too high for a transistor receiver.

By the term "power transformer" is meant the low frequency (usually 60 cycles in the United States) type used for deriving power from commercial power lines. It is not to be confused with higher frequency transformers normally used elsewhere in receivers, such as the horizontal output transformer normally used to energize the picture tube.

In general the object of the invention is accomplished by constructing the horizontal output transformer with primary and secondary windings rather than as an autotransformer as is usual. With this arrangement it becomes possible to energize many more of the elements of the receiver from the secondary of the horizontal output transformer which, for those elements, performs the function of isolating them and the chassis from the commercial power line, which function is now performed by the usual power transformer. This permits one to limit considerably the number of elements which must be energized directly by the commercial power line from the primary side of the horizontal output transformer to such a small number that they can economically and effectively be isolated from the chassis with consequent minimum danger to people.

My invention thus makes it possible to build a transformerless television receiver which not only solves the foregoing problems in an improved way but also provides other advantages which will appear from the following description and accompanying drawing of a preferred embodiment of the invention.

Referring to the drawing, the following will be recognized as conventional television receiver elements: antenna 1, chassis ground 2, radio frequency tuner 3, intermediate frequency amplifier 4, local oscillator 5, detector and automatic gain control 6, automatic gain control connection 7, video amplifier 8, picture tube 9 with yoke 10, sound amplifier and detector 11, sound power amplifier 12, loud speaker 13, synchronizing signal separator 14, vertical oscillator 15, vertical output 16, connection 17 to the vertical scanning coils of the yoke 10, horizontal scanning coils 18 of yoke 10, horizontal automatic frequency control 19, horizontal oscillator and buffer 20, horizontal driver 21, and horizontal output 22, the latter two being transistor stages as shown.

The invention resides in the manner in which the foregoing elements are energized as will now be explained.

At 23 there is shown the power source which is the common household electrical plug designed to be inserted in the common household socket for connection to the commercial power line which supplies B+ power at about 117 volts and 60 cycles in most parts of the United States. Rectifier 23 and filter 24 comprising resistors 25 and condensers 26 convert from AC power to DC power at about 53 volts across the right hand condenser 26. Horizontal automatic frequency control 19, horizontal oscillator and buffer 20, and horizontal driver 21 may then be energized as shown through resistor 27, the primary winding of transformer 28, and the leads 29. Similarly, horizontal output 22 may be energized through the inductance 30. Horizontal automatic frequency control 19 is driven by line synchronizing pulses from separator 14 through a small condenser as shown. Horizontal output 22 is driven by horizontal driver 21 through transformer 31 and in turn drives horizontal output transformer 32 through its primary winding 33. Secondary windings 34, 35, and 36 are insulated from the primary winding 33 as shown, and windings 34 and 35 are connected at their juncture to chassis ground as shown. High voltage is supplied to the picture tube 9 by winding 35 and rectifier 37 in the usual manner, the winding 36 supplying filament voltage for the filament of rectifier 37. Horizontal scanning coils 18 are energized by the circuit comprising condensers 38, 39, and 40, inductance 42, resistor 41, damper diode 43 and winding 34. There is also a damper diode 44 connected between the bottom of inductance 30 and at a tap on the primary of horizontal output transformer 32 as shown. The function of all of these elements will be explained below.

It should be noted that the circuit of the winding 34 energizes not only the scanning coils 18, but also supplies the B+ power for tuner 3, amplifier 4, oscillator 5, detector 6, amplifier 8, amplifier and detector 11, amplifier 12, separator 14, oscillator 15, and output 16. All of these elements are connected to chassis ground 2 as indicated. Horizontal automatic frequency control 19 is connected to chassis ground for AC through the small condenser shown; similarly with the high voltage lead to picture tube 9.

It is also to be noted that all of the units within the dotted line box are insulated from the chassis by any suitable means. There are so few components in the elements within this box that they may easily be insulated from the chassis. This section of the receiver is often shielded, and it would be quite easy to mount it on an insulated subchassis. It may not be necessary to operate the driver from the line rectifier, but it makes it start up more easily, since full power for the driver is immediately available.

In the circuit of the drawing, the transistor 45 is the main power transistor—PNP for the embodiment shown in the drawing. It drives horizontal scanning coils 18 through the winding 34 of horizontal output transformer 32. Inductance 42 is large and serves only to carry the DC current from the damper diode 43, preventing said current from flowing through horizontal scanning coils 18 and transformer 32. Inductance 30 carries the DC current of the transistor 45, and also serves in a tuned relationship with capacitance 46, as will be explained herein later.

In operation, the transistor 45 is driven into conduction by a pulse supplied by transistor 47 of horizontal driver 21 through the pulse transformer 31. This pulse is made to coincide with the blanking time of the picture signal by means well known in the art. Said pulse is polarized in the example shown, in which transistor 45 is a PNP type transistor, such as that the base of transistor 45 is driven negative with respect to its emitter. Lead 48 will thus be driven negative with respect to lead 49. Transistor 45 will thereby be driven into conduction, and the resulting current flow from emitter to collector will quickly reduce any voltage between them to a very low value.

In the drawing, it will be noted that lead 49, which is also the collector of transistor 45, is the reference or low AC point. Since it is the object of this invention to eliminate the power transformer, this same lead is connected directly to the power line. Depending on the polarity of the plug 22, said lead may be the hot side of the power line, and full 60 cycle voltage may exist on the lead with respect to ground. Such voltage will not alter the operation of the circuit, however, since no 60 cycle voltage occurs to any other portion of the transistor circuit. Therefore no 60 cycle currents will flow within the circuit. Therefore for purposes of analyzing the operation of the transistor, lead 50 may be considered to have no AC voltage upon it, and the voltages on the other leads may be considered with respect to lead 50.

Immediately prior to the driving pulse, the instantaneous voltage existing on lead 49 will be two to three times the DC supply voltage on the other side of inductance 30. This step up of voltage is due to resonance between inductance 30 and capacitance 46 as explained later. Then when transistor 45 is driven into conduction, it essentially connects lead 49 to lead 50 for the duration of the driving pulse. A large current flows through a number of components, but the essential circuit consists of capacitance 46 in series with the horizontal scanning coils 18 tied from the emitter to the collector. The charge which exists on the capacitance 46 provides the energy. A series resonant condition thus exists between the capacitance 46 and the horizontal scanning coils 18, and the voltage charge existing on the capacitance 46 becomes a current charge on the coils 18. This same voltage pulse has the further function of disconnecting the main damper diode 43 and the auxiliary damper diode 44. These diodes are thus inactive while the current builds up in the coils 18. As the current of the coils 18 builds up, its rate of change or derivative, decreases, and as the derivative goes through zero, the value of the voltage across the coils 18 also goes through zero. The voltage then builds up with the opposite polarity, and when it reaches the voltage across the resistor 41 and 100 mfd. capacitance 39, which is about 19 volts in the circuit shown, the diode 43 is again connected, and the current of the coils 18 transfers from the transistor to the diode. At this point, the current of the coils 18 is decreasing slowly. The voltage across the coils 18 will be held constant by the diode 43 and the RC, and the resulting linear decrease of the current through the coils 18 provides the desired scan of the electron beam in the picture tube, thus forming a line of the televised picture. When the current transfers from the transistor to the diode, the transistor current should drop instantly to zero. This is not possible due to the stored charge within the transistor. However, the current does drop quickly, with any excess transistor current flowing through the diode. It is desirable to have the driving pulse between the base and the emitter of the transistor end at this time also, for maximum efficiency.

It is characteristic of this type of circuit, in which the inductance of the scanning coils 18 is charged only during retrace, or blanking interval, that considerable power is suppplied to the circuit. Such power is transferred through the circuit as AC power, and reappears as DC power, which may be used for the operation of the remainder of the receiver. As explained herein, it is possible to arrange a very simple line connected 60 cycle rectifier to supply this power without the use of conventional heavy power transformers. By the use of a full transformer style horizontal output transformer instead of the usual autotransformer, this power, transformed to scanning line frequency AC power, may be made to reappear as DC power at the output of the deflection circuitry. This may be accomplished with no direct connection between the power line and the main chassis ground.

Using a 1:1 transformer, this system has a voltage step down. This is the same as saying a current step up. This is because roughly the same magnitude of current flows for roughly six times as long during trace, (or run down through the diode), as during retrace, (through the transistor). However, there is a resonant doubling or tripling of voltage in the transistor supply, giving an overall step down of roughly 3 to 1. The resonant rise is explained as follows: After the diode has been connected, and the transistor disconnected, capacitance 46 is recharged through inductance 30. The diode forms a low impedance across the transformer, and inductance 30 and capacitance 46 essentially form a series resonant circuit across the power supply. The current rises to a maximum from some small value, and then drops to a small value. The voltage lags by 90° and rises continually through the interval until the voltage on lead 49 reaches to two or more times the value of the voltage at the output of the power supply. The inductance 30 is designed so that approximately one half cycle of the resonance frequency of inductance 30 and capacitance 46 takes the time of one line scan. This is not critical, however, as the resonant rise effect is still obtained even though a smaller portion of a half of a cosine wave is used, and inductance 30 and capacitance 46 are tuned to a lower frequency.

The transformer need not be 1:1, however. Thus, by approximately changing the circuit impedances and the transformer ratio, it is possible to adjust the output DC voltage level over a considerable range. It is thus seen, that without the use of a 60 cycle power transformer, it is possible by means of this circuit, to obtain the two advantages of a power transformer, which are isolation and voltage adjustment.

By the use of the damper diode 44 on the primary side of the transformer 32, it is possible to return a portion of the power to the transistor 22. Without damper diode 44, more power than necessary may be available on the secondary side of the transformer 32. In order to adjust the amount of power fed back from the secondary to the primary side in this manner, the diode 44 may be tapped a few turns more or less than the point where the transistor is connected. The secondary power may thus be adjusted to the requirements for DC power on the secondary side of the horizontal output transformer, and non need be wasted, thereby increasing the overall efficiency. While it is theoretically possible to return all of the excess power on the secondary side to the primary side, it is not practical because of the leakage reactance of the transformer, which would cause objectionable transients, showing as wrinkles, or brighter vertical lines at the left side of the picture. It is thus necessary to use some damping on the secondary side of the horizontal output transformer 32. It is, of course, the chief object of this invention to supply DC power through the damper diode 43 on the secondary side of the transformer.

In the following claims and in accordance with the foregoing specification, the term "B power" is used to mean the type commonly referred to as B+ but without regard to polarity since, particularly in the case of transistors, polarity can be either positive or negative. It excludes power supplied to the picture tube and the AGC which have hitherto been supplied by secondaries on the horizontal output transformer.

I claim:

1. A television receiver adapted to operate without a power transformer comprising:

a chassis;

elements requiring B power grounded on said chassis;

a source of power directly connectable without a power transformer to a power line;

a horizontal output transformer having a primary winding and a secondary winding insulated from the primary winding;

other elements requiring B power insulating from said chassis and connected to said primary winding for driving said horizontial output transformer;

means for energizing said elements with B power from said secondary winding;

and means for energizing said other elements with B power from said source.

2. A receiver as in claim 1 in which said elements include at least an RF tuner, an IF amplifier, a local oscillator, a detector, a video amplifier, sound circuits, a synchronizing signal separator, a vertical oscillator, and a vertical output.

3. A receiver as in claim 1 in which said other elements include a horizontal AFC circuit, a horizontal oscillator and buffer, a horizontal driver, and a horizontal output.

4. A receiver as in claim 1 in which said means for energizing said elements with B power from said secondary winding comprises:

a horizontal scanning coil coupled to said secondary winding:

and damping means coupled to said secondary winding for producing said B power.

5. A receiver as in claim 4 including damping means coupled to said primary winding for controlling the power distribution between said primary and secondary windings.

6. A receiver as in claim 4 including a resonant LC circuit between said primary winding and said source.

References Cited

UNITED STATES PATENTS 3,381,165 4/1968 Taylor -------------- 315—27

OTHER REFERENCES

Towers, Transistor Television Receivers, pp. 150–152, 1963.

ROBERT L. GRIFFIN, Primary Examiner

ROBERT L. RICHARDSON, Assistant Examiner

U.S. Cl. X.R.

315—27